(12) United States Patent
Margiott et al.

(10) Patent No.: US 6,368,737 B1
(45) Date of Patent: Apr. 9, 2002

(54) SUBAMBIENT PRESSURE COOLANT LOOP FOR A FUEL CELL POWER PLANT

(75) Inventors: Paul R. Margiott, South Windsor, CT (US); Valerie A. Maston, Pittsfield, MA (US); Glenn W. Scheffler, Tolland, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/615,231

(22) Filed: Jul. 13, 2000

(51) Int. Cl.[7] .............................................. H01M 8/04
(52) U.S. Cl. .............................. 429/26; 429/12; 429/13; 429/25; 429/38
(58) Field of Search ............................ 429/12, 13, 25, 429/26, 38

(56) References Cited

U.S. PATENT DOCUMENTS

| | | | |
|---|---|---|---|
| 4,769,297 A | 9/1988 | Reiser et al. | 429/17 |
| 5,064,732 A | 11/1991 | Meyer | 429/13 |
| 5,503,944 A | 4/1996 | Meyer et al. | 429/13 |
| 5,700,595 A | 12/1997 | Reiser | 429/13 |
| 6,207,309 B1 * | 3/2001 | Bonville et al. | 429/26 |

FOREIGN PATENT DOCUMENTS

JP     2001-210335    *  8/2001    ............ H01M/8/02

* cited by examiner

Primary Examiner—Carol Chaney
Assistant Examiner—Dah-Wei D. Yuan
(74) Attorney, Agent, or Firm—McCormick, Paulding & Huber LLP

(57) ABSTRACT

A fuel cell power plant having a fuel cell assembly includes an anode provided with a fuel stream, a cathode provided with an oxidant stream, an ion exchange membrane oriented between said anode and said cathode, and a coolant loop circulating a coolant stream in fluid communication with the fuel cell assembly. An oxidant source is utilized for supplying the fuel cell assembly with the oxidant stream at a predetermined pressure, while a coolant regulator oriented along the coolant loop lowers the coolant stream to a subambient pressure prior to the coolant stream coming into fluid communication with the fuel cell assembly.

20 Claims, 2 Drawing Sheets

SUBAMBIENT PRESSURE COOLANT LOOP FOR A FUEL CELL POWER PLANT

FIELD OF THE INVENTION

This invention relates in general to a subambient pressure coolant loop for a fuel cell power plant, and deals more particularly with a subambient pressure coolant loop for a fuel cell power plant wherein the parasitic energy required to maintain the reactants of the fuel cell power plant within operating parameters is substantially reduced.

BACKGROUND OF THE INVENTION

Electrochemical fuel cell assemblies are known for their ability to produce electricity and a subsequent reaction product through the interaction of a reactant fuel being provided to an anode electrode and a reactant oxidant being provided to a cathode electrode, generating an external current flow there-between. Such fuel cell assemblies are very useful due to their high efficiency, as compared to internal combustion fuel systems and the like, and may be applied in many fields. Fuel cell assemblies are additionally advantageous due to the environmentally friendly chemical reaction by-products, typically water, which are produced during their operation. Owing to these characteristics, amongst others, fuel cell assemblies are particularly applicable in those fields requiring highly reliable, stand-alone power generation, such as is required in space vehicles and mobile units including generators and motorized vehicles.

Typically, electrochemical fuel cell assemblies employ a hydrogen-rich gas stream as a fuel and an oxygen-rich gas stream as an oxidant, whereby the resultant reaction by-product is water. Such fuel cell assemblies may employ a membrane consisting of a solid polymer electrolyte, or ion exchange membrane, disposed between the anode and cathode electrode substrates formed of porous, electrically conductive sheet material—typically, carbon fiber paper. One particular type of ion exchange membrane is known as a proton exchange membrane (hereinafter PEM), such as sold by DuPont under the trade name NAFION™ and well known in the art. Catalyst layers are formed between the PEM and each electrode substrate to promote the desired electrochemical reaction. The catalyst layer in a fuel cell assembly is typically a carbon supported platinum or platinum alloy, although other noble metals or noble metal alloys may be utilized. In order to control the temperature within the fuel cell assembly, a water coolant is typically provided to circulate about the fuel cell assembly.

In the typical operation of a PEM fuel cell assembly, a hydrogen rich fuel permeates the porous electrode material of the anode and reacts with the catalyst layer to form hydrogen ions and electrons. The hydrogen ions migrate through the PEM to the cathode electrode while the electrons flow through an external circuit connected to a load to the cathode. At the cathode electrode, the oxygen-containing gas supply also permeates through the porous substrate material and reacts with the hydrogen ions and the electrons from the anode electrode at the catalyst layer to form the by-product water. Not only does the PEM facilitate the migration of these hydrogen ions from the anode to the cathode, but the ion exchange membrane also acts to isolate the hydrogen rich fuel from the oxygen-containing gas oxidant. The reactions taking place at the anode and cathode catalyst layers may be represented by the following equations:

Anode reaction: $H_2 \rightarrow 2H^+ + 2e$

Cathode reaction: $\frac{1}{2}O_2 \; 30 \; 2H^+ + 2e \rightarrow H_2O$

In practical applications, a plurality of planar fuel cell assemblies are typically arranged in a stack, commonly referred to as a cell stack assembly. The cell stack assembly may be surrounded by an electrically insulating housing that defines the various manifolds necessary for directing the flow of a hydrogen-rich fuel and an oxygen-rich oxidant into and out of the individual fuel cell assemblies, as well as a coolant stream, in a manner well known in the art. The cell stack assembly, including any associated components such as a degasifier, a demineralizer, a steam reformer, a heat exchanger and the like may, as a whole, be referred to as a fuel cell power plant.

As will be appreciated by one so skilled in the art, tying these differing components into a cohesive fuel cell power plant operating within specific design parameters results in a complex and oftentimes cumbersome structure.

Specifically, in the operation of PEM fuel cells, it is critical that a proper water balance be maintained between a rate at which water is produced at the cathode electrode, including water resulting from proton drag through the PEM electrolyte, and rates at which water is removed from the cathode or supplied to the anode electrode. An operational limit on performance of a fuel cell is defined by an ability of the cell to maintain an optimal water balance as the electrical current drawn from the cell into the external load circuit varies and as an operating environment of the cell varies. For PEM fuel cells, if insufficient water is returned to the anode electrode, adjacent portions of the PEM electrolyte dry out, thereby decreasing the rate at which hydrogen ions may be transferred through the PEM and also resulting in cross-over of the reducing fluid leading to local over heating. Similarly, if insufficient water is removed from the cathode, the cathode electrode may become flooded effectively limiting oxidant supply to the cathode and hence decreasing current flow. Additionally, if too much water is removed from the cathode, the PEM may dry out limiting ability of hydrogen ions to pass through the PEM thus decreasing cell performance.

A common approach to maintaining appropriate water equilibrium within a fuel cell power plant resides in a judicious balancing of pressures between the fuel and oxidant reactants and the coolant stream. By providing the fuel and oxidant streams at a higher pressure than that of the coolant stream, the flow of excess water created within the fuel cell assembly may be assuredly directed towards the coolant stream for removal and subsequent resupply.

An example of a fuel cell power plant utilizing such a balancing of pressures is shown in commonly owned U.S. Pat. No. 4,769,297 issued to Reiser et al., on Sep. 6, 1988, and incorporated herein by reference in its entirety. The water management system of Reiser utilizes entrained water in the hydrogen fuel gas stream provided to the anode electrode of each fuel cell as a coolant to help humidify and cool the fuel cell power plant during operation. The hydrogen fuel and entrained water will humidify the anode electrode, while the proton dragging effect will cause excess water to migrate across the ion exchange membrane to the cathode electrode, thereby also humidifying the ion exchange membrane. Reiser maintains a pressure differential between the anode flow field and the cathode flow field, both of which are maintained above ambient pressure, such that water accumulating at the cathode electrode of each fuel cell migrates across a separator plate to the next anode electrode in the cell stack assembly of the fuel cell power plant. The water management system of Reiser therefore does not utilize a separate coolant loop.

Another fuel cell power plant operating system is disclosed in commonly owned U.S. Pat. No. 5,064,732 issued to Meyer on Nov. 12, 1991, and is incorporated herein by reference in its entirety. The operating system of Meyer is also devoid of a dedicated coolant loop and instead utilizes a pressure differential between the anode and cathode flows of the fuel cell to assist in the proper migration of water throughout the fuel cell power plant. In Meyer, a back pressure regulator is utilized with a porous element in order to remove excess water from the anode of the fuel cell power plant.

Another fuel cell power plant operating system is disclosed in commonly owned U.S. Pat. No. 5,503,944 issued to Meyer et al. on Apr. 2, 1996, and is incorporated herein by reference in its entirety. The operating system of Meyer et al. incorporates a dedicated coolant loop while also utilizing a pressure differential between the reactant gasses and the coolant to assist in the proper migration of water throughout the fuel cell power plant. In Meyer et al., the coolant loop may be operated at approximately ambient pressures provided that the pressure of the oxidant reactant is slightly above that of the coolant loop.

Another fuel cell power plant operating system is disclosed in commonly owned U.S. Pat. No. 5,700,595 issued to Reiser on Dec. 23, 1997, and is incorporated herein by reference in its entirety. The operating system of Reiser also utilizes a pressure differential between the reactant gasses and the coolant to assist in the proper migration of water throughout the fuel cell power plant. In Reiser, fine pore separator plates may be utilized throughout the fuel cell power plant due to this pressure differential.

Although each of the foregoing systems ensure the efficient migration of water throughout a fuel cell power plant by maintaining a relative pressure differential between the reactant gas streams and the coolant stream, the parasitic power requirements of these systems varies widely and affects the efficiency of the fuel cell power plants as a whole.

The present invention therefore seeks to reduce this parasitic power drain on the overall operating system of a fuel cell power plant by operating the coolant stream at a subambient pressure which in turn reduces the parasite power to pump the air. As it requires less power to pressurize a water stream in comparison to a gaseous stream, the present invention proposes to utilize this relationship in order to promote greater energy savings during operation of the fuel cell power plant.

With the forgoing problems and concerns in mind, the present invention seeks to provide a fuel cell power plant in which a multitude of separate components are integrated in order to allow the fuel cell power plant to operate at peak efficiency.

SUMMARY OF THE INVENTION

It is an object of the present invention to utilize a subambient pressure coolant loop for a fuel cell power plant.

It is another object of the present invention to utilize a subambient pressure coolant loop for a fuel cell power plant, and thereby reduce the parasitic energy required to maintain the reactants of the fuel cell power plant within operating parameters.

It is another object of the present invention to reduce the complexity of the fuel cell power plant by reducing the number of components needed to operate the fuel cell power plant.

It is another object of the present invention to allow reactant gases to be utilized at approximately ambient pressures.

According to one embodiment of the present invention, a fuel cell power plant having a fuel cell assembly includes an anode provided with a fuel stream, a cathode provided with an oxidant stream, an ion exchange membrane oriented between said anode and said cathode, and a coolant loop circulating a coolant stream in fluid communication with the fuel cell assembly.

An oxidant source is utilized for supplying the fuel cell assembly with the oxidant stream at a predetermined pressure, while a coolant regulator oriented along the coolant loop lowers the coolant stream to a subambient pressure prior to the coolant stream coming into fluid communication with the fuel cell assembly.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
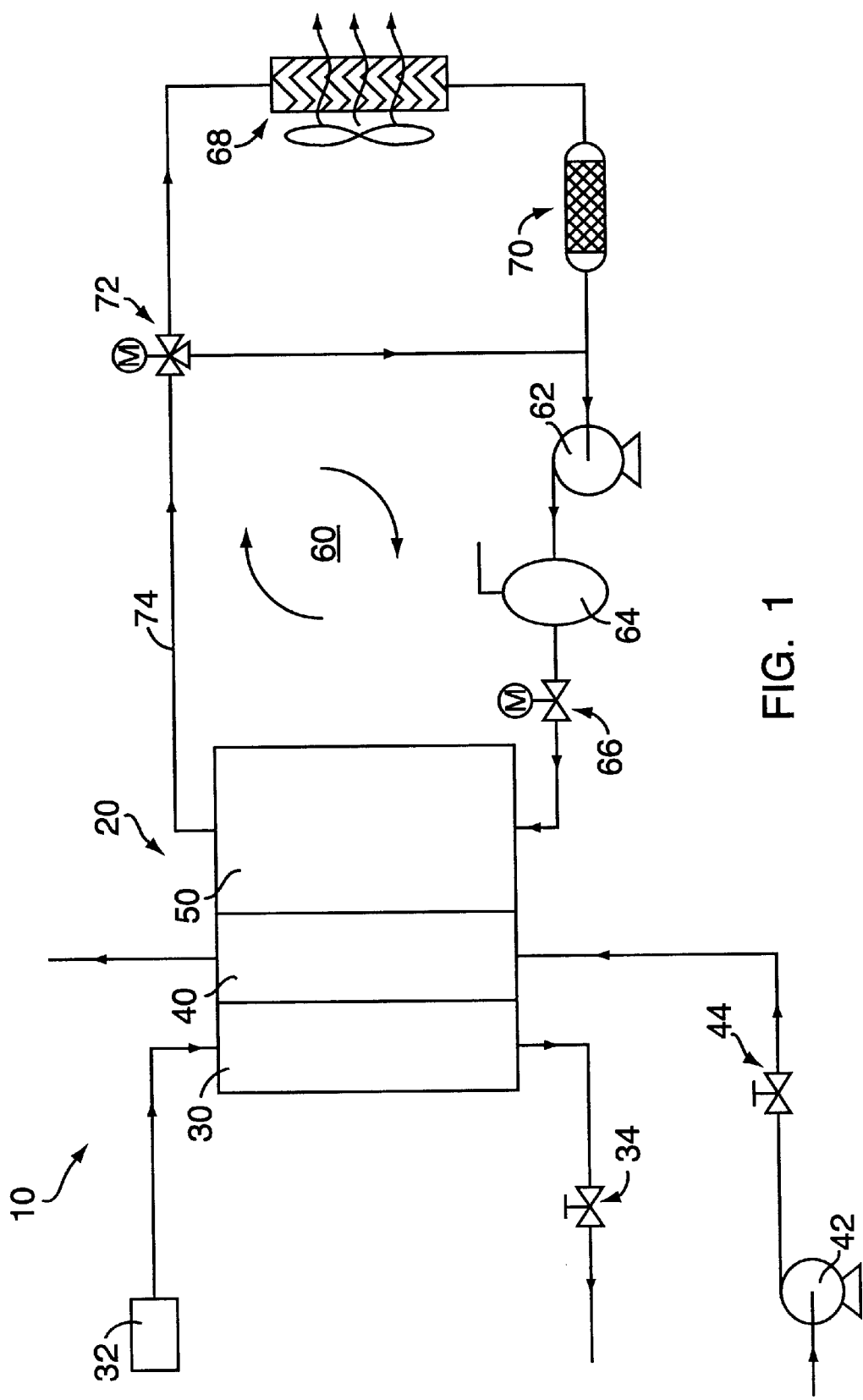
FIG. 1 illustrates a schematic illustration of a fuel cell power plant employing a subambient pressure coolant loop, according to one embodiment of the present invention.

A fuel cell power plant utilizing a subambient pressure coolant loop according to the present invention is schematically illustrated in FIG. 1 and is generally designated by reference numeral 10. As utilized hereinafter, the term 'subambient' is meant to reference those pressures below atmospheric, that is, below approximately 14.7 lbs/in$^2$ absolute, while the term 'ambient' references those pressures approximately equal to atmospheric pressure. The fuel cell power plant 10 includes at least one fuel cell assembly 20 having an anode electrode 30 and a cathode electrode 40 disposed on either side of a non-illustrated ion exchange membrane. By supplying a hydrogen-rich fuel to the anode electrode 30 and an oxygen-rich oxidant to the cathode electrode 40, the fuel cell assembly 20 will produce electrical energy in a manner well known in the art. In the preferred embodiment of the present invention, the fuel cell assembly 20 of FIG. 1 employs a proton exchange membrane ("PEM") as the non-illustrated ion exchange membrane and is coated on either side thereof with an unillustrated catalyst layer utilized to promote the electrochemical reaction within the fuel cell assembly 20, as is known.

While FIG. 1 depicts a single fuel cell assembly 20, the fuel cell power plant 10 may be alternatively operated in conjunction with a plurality of electrically coupled planar fuel cell assemblies, forming thereby a cell stack assembly that is encased within a non-illustrated housing and which defines various reactant manifolds for directing a hydrogen-rich fuel stream and an oxygen-rich oxidant stream to and from the cell stack assembly as a whole.

A fine pore water transport plate 50 is located adjacent the cathode electrode 40 and is in fluid communication with the fuel cell assembly 20. The water transport plate 50 is part of an integrated coolant loop 60 which assists in managing the temperature of the fuel cell power plant 10, in addition to maintaining proper water balance within the fuel cell power plant 10.

The present invention seeks to increase the efficiency of the fuel cell power plant 20 by reducing the parasitic power drain typically incurred as a result of pressurizing the reactant gas streams to well above ambient pressures. Towards this end, the present invention seeks to utilize a subambient coolant loop while maintaining a positive pressure differential between the reactant gas streams and the coolant stream. With such a configuration, it is possible to utilize an oxidant gaseous stream at approximately ambient pressure, as would be desirable in mobile fuel cell applications such as motorized vehicles. Since less power is required to pump the coolant water than is required to pump the gaseous stream or streams, it has been discovered that a reduction in the operating pressure of the oxidant gaseous stream results in a substantial reduction in the overall power consumption of the fuel cell power plant 20.

As depicted in FIG. 1, the anode electrode 30 of the fuel cell assembly 20 is provided with a reactant fuel, typically a hydrogen-rich gas stream, from a fuel processing system 32 or the like, as is commonly known in the art. A fuel pressure valve 34 or other means may be utilized to control, either manually or automatically, the pressure of the fuel provided to the anode electrode 30. Likewise, the cathode electrode 40 of the fuel cell assembly 20 is provided with a reactant oxidant, typically an oxygen-rich gas stream. The oxidant may be an oxygen-containing atmosphere directed towards the cathode electrode 40 by relative movement between the fuel cell power plant 10 and the atmospheric environment. As specifically depicted in FIG. 1, an oxidant stream is provided to the cathode electrode 40 via a variable speed oxidant blower 42, the volume of which is controlled, either manually or automatically, by an oxidant flow control valve 44 so as to ensure that the oxidant stream is provided at approximately ambient pressure to the fuel cell assembly 20. Alternatively, the flow control valve 44 may be eliminated and the flow rate controlled solely by using the variable speed blower 42. In the preferred embodiment of the present invention, the fuel stream is controlled to be slightly below the operating pressure of the oxidant.

As indicated previously, the coolant stream is designed to flow within the water transport plate 50 at pressures below the ambient pressure of the oxidant gaseous stream. A coolant pump 62 provides the impetus for circulating the coolant stream within the coolant loop 60. The coolant pump 62 propels the coolant stream to an accumulator 64 which is adapted to be open to ambient pressure, thereby ensuring that the coolant stream exiting the coolant pump 62 is maintained at approximately ambient pressure. The accumulator 64 may be oriented on the suction side or the discharge side (as depicted in FIG. 1) of the coolant pump 62. A pressure control valve 66 is subsequently utilized to lower the pressure of the coolant stream to a desired inlet subambient pressure. The subambient coolant stream is then provided to the water transport plate 50 before exiting the fuel cell assembly 20.

The accumulator 64, the coolant pump 62 and the pressure control valve 66, operating in combination, therefore act as an effective coolant regulator for providing the fuel cell assembly 20 with a continuously circulating stream of subambient coolant. The pressure control valve 66 may be any known pressure control device such as a fixed orifice, a manually controlled valve, or an automatically controlled valve. The valve may be actuated electrically, hydraulically or pneumatically, as is well known.

After exiting the fuel cell assembly 20, the subambient coolant stream continues circulating in the coolant loop 60 whereby a portion of the coolant stream is directed to a heat exchanger 68 and a demineralizer 70 for the purposes of heat dissipation and coolant purification, respectively. Alternatively the demineralizer 70 may be configured such that only a portion of the coolant passes through it as is known. A temperature control valve 72 is positioned along an exit conduit 74 in order to monitor the exit temperature of the coolant stream leaving the fuel cell assembly 20. As the temperature of the exiting coolant stream, or the fuel cell assembly 20 as a whole, fluctuates, the temperature control valve 72 diverts a greater or lesser amount of the coolant stream to the heat exchanger 68, as appropriate, to maintain the temperature of the fuel cell assembly 20 within operating parameters.

While the heat exchanger 68 is depicted as a radiator element and fan in combination, the present invention is not limited in this regard as other known heat exchangers may be alternatively utilized without departing from the broader aspects of the present invention. Likewise, the demineralizer 70 may in fact comprise both a deminearlizer and a degasifier, including known mass transfer devices, provided that the coolant stream is effectively stripped of dissolved gases and suspended solids before resupply to the fuel cell assembly 20. Likewise the temperature control valve and by-pass line are optional or may be implemented in various alternative ways without departing from the broader aspects of the present invention.

In operation, product water is formed at the cathode electrode 40 due to the electrochemical reaction taking place within the fuel cell assembly 20. Additional water is also provided to the cathode electrode 40 as a result of proton drag across the non-illustrated PEM separating the anode electrode 30 from the cathode electrode 40, the ionic migration carrying along water from both the PEM and the anode electrode 30 to the cathode electrode 40. Typically liquid water or water vapor are provided to anode electrode 30 to humidify the PEM.

The pressure differential between the oxidant stream within the cathode electrode 40 and the subambient coolant stream provides a positive pumping force to affect the migration of water molecules through the porous cathode electrode 40 and into the subambient coolant stream within the fine pore water transport plate 50. Consequently, flooding of the cathode electrode 40 is effectively prevented. Moreover, in applications where multiple fuel cell assemblies are configured to be in stacked relation to one another, as in a cell stack assembly, the fine pores of the porous anode electrode 30 exert a capillary effect upon the coolant circulating within the fine pore water transport plate 50. In doing so, water wicks into the fine pores and is provided to the anode electrode 30 in a manner so as to prevent drying of the anode electrode 30.

It will be readily appreciated that manipulating the pressure of the reactant fuel via the fuel pressure valve 34, or the like, will correspondingly augment the wetting of the anode electrode 30 by affecting the rate at which the water will wick into the fine pores of the anode electrode 30. That is, by increasing or lowering the pressure of the reactant fuel stream, the anode electrode 30 will experience, respectively, a lesser or greater influx of water. It is therefore possible to humidify the anode electrode 30 while ensuring that the anode electrode 30 does not become flooded.

It should be noted that the oxidant exhausted from the cathode electrode 40 may be furnished to the fuel processing system 32 or to a non-illustrated water recovery device as is known, if the fuel cell power plant 10 is so equipped, or rather the exhausted oxidant may be simply vented to the surrounding environment. Likewise, the fuel stream exhausted from the anode electrode 30 may be directed to the fuel processing system 32 or to a non illustrated water recovery device where entrained water or water vapor may be condensed and recaptured for later use, as is known.

It is therefore an important aspect of the present invention that efficient water management of the fuel cell power plant 10 is accomplished in a passive manner through the use of pressure differentials in the reactant gaseous streams and the coolant stream.

It is another important aspect of the present invention to reduce the parasitic power consumption of the fuel cell power plant 10 by augmenting the pressure of the liquid coolant rather than pressurizing the reactant gaseous streams.

It will be readily apparent that in mobile, stand-alone applications, such as use in conjunction with motorized vehicles, the oxidant blower 42 may be automatically controlled so as to operate only during those times when the interaction between the fuel cell power plant 10 and the atmospheric environment is not sufficient to cause the oxidant gas to pass through the fuel cell power assembly 20 at approximately ambient pressure. Therefore, another important aspect of the present invention resides in the intermittent operation of the oxidant blower 42, with a corresponding conservation of parasitic power drain on the fuel cell power plant 10 as a whole.

Figure 2:
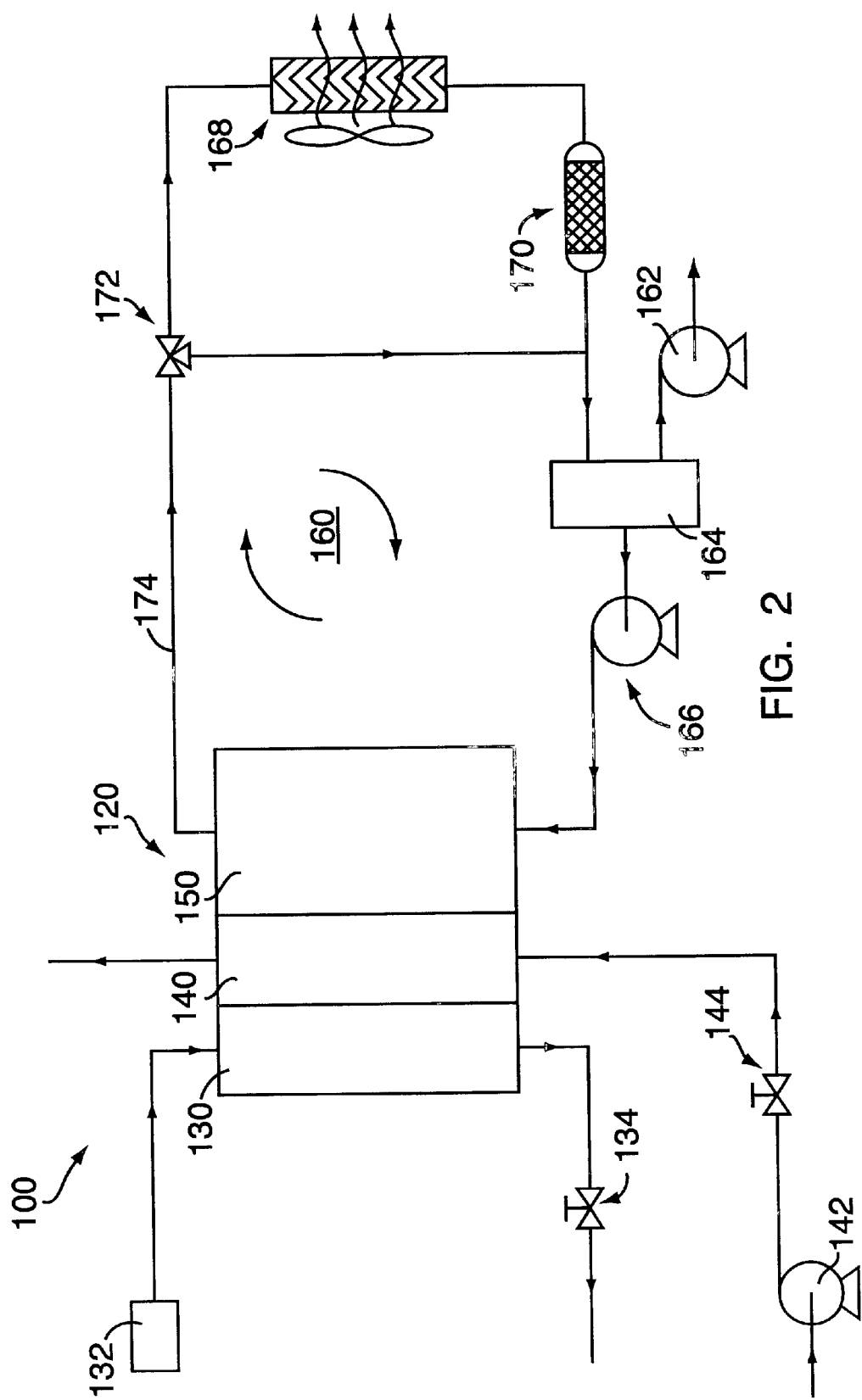
FIG. 2 illustrates a schematic illustration of a fuel cell power plant employing a subambient pressure coolant loop, according to another embodiment of the present invention.

Another embodiment of a fuel cell power plant utilizing a subambient pressure coolant loop according to the present invention is schematically illustrated in FIG. 2 and is generally designated by reference numeral 100. The fuel cell power plant 100 includes at least one fuel cell assembly 120 having an anode electrode 130 and a cathode electrode 140 disposed on either side of a non-illustrated electrolyte. By supplying a hydrogen-rich fuel to the anode electrode 130 and an oxygen-rich oxidant to the cathode electrode 140, the fuel cell assembly 120 will produce electrical energy in a manner well known in the art. The fuel cell assembly 120 of FIG. 2 also employs a PEM and is coated on either side thereof with an unillustrated catalyst layer utilized to promote the electrochemical reaction within the fuel cell assembly 120.

While FIG. 2 depicts a single fuel cell assembly 120, the fuel cell power plant 100 may be alternatively operated in conjunction with a plurality of electrically coupled planar fuel cell assemblies, forming thereby a cell stack assembly that is encased within a non-illustrated housing and which defines various reactant manifolds for directing a hydrogen-rich fuel stream and an oxygen-rich oxidant stream to and from the cell stack assembly as a whole.

A fine pore water transport plate 150 is located adjacent the cathode electrode 140 and is in fluid communication with the fuel cell assembly 120. The water transport plate 150 is part of an integrated coolant loop 160 which assists in managing the temperature of the fuel cell power plant 100, in addition to maintaining proper water balance within the fuel cell power plant 100.

The fuel cell power plant 100 as depicted in FIG. 2 illustrates another embodiment for integrating the subambient coolant loop 160. Similar to the embodiment depicted in FIG. 1, the anode electrode 130 of the fuel cell assembly 120 is provided with a reactant fuel, typically a hydrogen-rich gas stream, from a fuel processing system 132 or the like, as is commonly known in the art. A fuel pressure valve 134 or other means may be utilized to control, either manually or automatically, the pressure of the fuel provided to the anode electrode 130. Likewise, the cathode electrode 140 of the fuel cell assembly 120 is provided with a reactant oxidant, typically an oxygen-rich gas stream. The oxidant may be oxygen containing atmosphere directed towards the cathode electrode 140 by relative movement between the fuel cell power plant 100 and the environment. As also depicted in FIG. 2, an oxidant stream is provided to the cathode electrode 140 via an oxidant blower 142, the volume of which is controlled, either manually or automatically, by an oxidant flow control valve 144 so as to ensure that the oxidant stream is provided at approximately ambient pressure to the fuel cell assembly 120. The fuel stream is controlled to be slightly below the operating pressure of the oxidant.

As indicated previously, the coolant stream is designed to flow within the water transport plate 150 at pressures below the ambient pressure of the oxidant gaseous stream. Towards this end, a vacuum pump 162 is located along the coolant loop 160 to lower the pressure within a coolant reservoir tank 164 to below-ambient pressures. In this configuration, a coolant pump 166 provides the impetus for circulating the coolant stream drawn from the reservoir tank 164, thereby overcoming the inherent coolant loop pressure drop. The coolant pump 166 propels the subambient coolant stream to the water transport plate 150 before exiting the fuel cell assembly 120. The reservoir tank 164 and the vacuum pump 162, in combination, therefore act as an effective coolant regulator for providing the fuel cell assembly 120 with a continuously circulating stream of subambient pressure coolant.

After exiting the fuel cell assembly 120, the subambient coolant stream continues circulating in the coolant loop 160 whereby a portion of the coolant stream is directed to a heat exchanger 168 and a demineralizer 170 for the purposes of heat dissipation and coolant purification, respectively. A temperature control valve 172 is positioned along an exit conduit 174 in order to monitor the exit temperature of the coolant stream leaving the fuel cell assembly 120. As the temperature of the exiting coolant stream, or the fuel cell assembly 120 as a whole, fluctuates, the temperature control valve 172 diverts a greater or lesser amount of the coolant stream to the heat exchanger 168, as appropriate, to maintain the temperature of the fuel cell assembly 120 within operating parameters.

While the heat exchanger 168 is depicted as a radiator element and fan in combination, the present invention is not limited in this regard as other known heat exchangers may be alternatively utilized without departing from the broader aspects of the present invention. Likewise, the demineralizer 170 may in fact comprise both a deminearlizer and a degasifier, including known mass transfer devices, provided that the coolant stream is effectively stripped of dissolved gases and suspended solids before being resupplied to the fuel cell assembly 120. Likewise, the temperature control valve and by-pass line are optional or may be implemented in various ways.

In operation, product water is formed at the cathode electrode 140 due to the electrochemical reaction taking place within the fuel cell assembly 120. Additional water is also provided to the cathode electrode 140 as a result of proton drag across the non-illustrated PEM separating the anode electrode 130 from the cathode electrode 140, the ionic migration carrying along water from both the PEM and the anode electrode 130 to the cathode electrode 140. Typically liquid water or water vapor are provided to the anode electrode 30 to humidify the PEM.

The pressure differential between the oxidant stream within the cathode electrode 140 and the subambient coolant stream provides a positive pumping force to affect the migration of water molecules through the porous cathode electrode 140 and into the subambient coolant stream within the fine pore water transport plate 150. Consequently, flooding of the cathode electrode 140 is effectively prevented. Moreover, in applications where multiple fuel cell assemblies are configured to be in stacked relation to one another, as in a cell stack assembly, the fine pores of the porous anode electrode 130 exert a capillary effect upon the coolant circulating within the fine pore water transport plate 150. In doing so, water is provided to the anode electrode 130 in a manner so as to prevent drying of the anode electrode 130.

As discussed previously, manipulating the pressure of the reactant fuel via the fuel pressure valve 134, or the like, will correspondingly augment the wetting of the anode electrode 130 by affecting the rate at which the water will wick into the fine pores of the anode electrode 130. That is, by increasing or lowering the pressure of the reactant fuel stream, the anode electrode 130 will experience, respectively, a lesser or greater influx of water. It is therefore possible to humidify the anode electrode 130 while ensuring that the anode electrode 130 does not become flooded.

Once the proper pressure differential is established between the reactant gas streams and the coolant stream, appropriate water management of the fuel cell power plants, 10 and 100 respectively of FIGS. 1 and 2, ensues automatically and is passively maintained without the need for complex mechanical arrangements. Any changes in the operating parameters of the fuel cell power plant, including changes in power output, cell performance and temperature, may be accommodated by adjustments to the pressure of the fuel and oxidant supplied to the fuel cell power plant, the flow rate of the coolant stream, the pressure of the coolant stream, or an adjustment made to any combination of these parameters.

The present invention therefore utilizes a heretofore unknown subambient coolant stream to reduce parasitic power drain on the fuel cell power plant, while assisting in the passive water management of the fuel cell power plant.

As can be seen from the foregoing disclosure and figures in combination, a fuel cell power plant configured for use with a subambient coolant stream is advantageously provided with a plurality of beneficial operating attributes, including, but not limited to: passive water management of the fuel cell power plant including humidification of the anode and cathode electrodes, as well as the PEM, while protecting against local flooding of these elements and reducing the parasitic power consumption on the fuel cell power plant. All of these attributes contribute to the efficient operation of a fuel cell power plant and are especially beneficial to those applications, such as motor vehicle manufacturing, which demand high performance, reliability and energy efficiency.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A fuel cell power plant having a fuel cell assembly including an anode provided with a fuel stream, a cathode provided with an oxidant stream, an ion exchange membrane oriented between said anode and said cathode, and a coolant loop circulating a coolant stream in fluid communication with said fuel cell assembly, said fuel cell power plant comprising:

an oxidant source for supplying said fuel cell assembly with said oxidant stream at a predetermined pressure; and a coolant regulator oriented along said coolant loop, said coolant regulator lowering said coolant stream to a subambient pressure prior to said coolant stream coming into fluid communication with said fuel cell assembly.

2. The fuel cell power plant according to claim 1, wherein:

said predetermined pressure is approximately ambient pressure.

3. The fuel cell power plant according to claim 2, wherein:

said coolant loop includes a fine pore water transfer plate in fluid communication with said cathode, wherein said coolant stream flows within said water transfer plate; and said coolant regulator supplies said water transfer plate with said subambient coolant stream.

4. The fuel cell power plant according to claim 3, wherein:

said coolant loop further comprises a heat exchanger and a coolant purifier, wherein said heat exchanger and said coolant purifier treat a first portion of said coolant stream exiting said water transport plate; and said coolant regulator is oriented downstream of said heat exchanger and said coolant purifier so as to be provided with said treated portion of said coolant stream.

5. The fuel cell power plant according to claim 4, wherein:

said coolant loop further comprises a coolant loop valve oriented along said coolant loop at a location after said coolant stream exits said water transport plate, but before said heat exchanger and said coolant purifier; and said coolant loop valve selectively diverts a second portion of said coolant stream exiting said water transfer plate to said coolant regulator, said second portion not circulating through said heat exchanger and said coolant purifier.

6. The fuel cell power plant according to claim 5, wherein:

said coolant loop valve increases one of said first and second portions of said coolant stream in dependence upon an operating temperature of said fuel cell assembly.

7. The fuel cell power plant according to claim 3, wherein:

said coolant regulator comprises an accumulator exposed to approximately ambient pressure and a coolant pressure valve, said coolant pressure valve oriented between said accumulator and said water transfer plate;

said accumulator supplies said coolant pressure valve with said coolant stream at approximately ambient pressure; and said coolant pressure valve operates to lower said coolant stream exiting said coolant pressure valve to a subambient pressure.

8. The fuel cell power plant according to claim 3, wherein:

said coolant regulator comprises a reservoir tank for storing a amount of said coolant stream at subambient pressures and a coolant pump, said coolant pump oriented between said reservoir tank and said water transfer plate;

said reservoir tank supplies said coolant pump with said coolant stream at subambient pressures; and said coolant pump operates to deliver said subambient coolant stream to said water transfer plate.

9. The fuel cell power plant according to claim 8, wherein:

said coolant regulator further comprises a vacuum pump for lowering said reservoir tank to subambient pressures.

10. A fuel cell power plant including a cell stack assembly having a plurality of fuel cell assemblies in electrical communication with one another, wherein each of said fuel cell assemblies include an anode provided with a fuel stream, a cathode provided with an oxidant stream and an ion exchange membrane oriented between said anode and said cathode, said fuel cell power plant further includes a coolant loop circulating a coolant stream in fluid communication with said cell stack assembly, said fuel cell power plant comprising:

an oxidant source for supplying said cell stack assembly with said oxidant stream at a predetermined pressure; and a coolant regulator oriented along said coolant loop, said coolant regulator lowering said coolant stream to a subambient pressure prior to said coolant stream coming into fluid communication with said cell stack assembly.

11. The fuel cell power plant including a cell stack assembly according to claim 10, wherein:

said predetermined pressure is approximately ambient pressure.

12. The fuel cell power plant including a cell stack assembly according to claim 11, wherein:

said coolant loop includes a fine pore water transfer plate in fluid communication with said cell stack assembly, wherein said coolant stream flows within said water transfer plate; and said coolant regulator supplies said water transfer plate with said subambient coolant stream.

13. The fuel cell power plant including a cell stack assembly according to claim 12, wherein:

said coolant loop further comprises a heat exchanger and a coolant purifier, wherein said heat exchanger and said coolant purifier treat a first portion of said coolant stream exiting said water transport plate; and said coolant regulator is oriented downstream of said heat exchanger and said coolant purifier so as to be provided with said treated portion of said coolant stream.

14. The fuel cell power plant including a cell stack assembly according to claim 13, wherein:

said coolant loop further comprises a coolant loop valve oriented along said coolant loop at a location after said coolant stream exits said water transport plate, but before said heat exchanger and said coolant purifier; and said coolant loop valve selectively diverts a second portion of said coolant stream exiting said water transfer plate to said coolant regulator, said second portion not circulating through said heat exchanger and said coolant purifier.

15. The fuel cell power plant including a cell stack assembly according to claim 14, wherein:

said coolant loop valve increases one of said first and second portions of said coolant stream in dependence upon an operating temperature of said cell stack assembly.

16. The fuel cell power plant including a cell stack assembly according to claim 12, wherein:

said coolant regulator comprises an accumulator exposed to approximately ambient pressure and a coolant pressure valve, said coolant pressure valve oriented between said accumulator and said water transfer plate;

said accumulator supplies said coolant pressure valve with said coolant stream at approximately ambient pressure; and said coolant pressure valve operates to lower said coolant stream exiting said coolant pressure valve to a subambient pressure.

17. The fuel cell power plant according to claim 12, wherein:

said coolant regulator comprises a reservoir tank for storing a amount of said coolant stream at subambient pressures and a coolant pump, said coolant pump oriented between said reservoir tank and said water transfer plate;

said reservoir tank supplies said coolant pump with said coolant stream at subambient pressures; and said coolant pump operates to deliver said subambient coolant stream to said water transfer plate.

18. The fuel cell power plant according to claim 17, wherein:

said coolant regulator further comprises a vacuum pump for lowering said reservoir tank to subambient pressures.

19. A method of operating a fuel cell power plant including a cell stack assembly having a plurality of fuel cell assemblies in electrical communication with one another, wherein each of said fuel cell assemblies include an anode provided with a fuel stream, a cathode provided with an oxidant stream and an ion exchange membrane oriented between said anode and said cathode, said fuel cell power plant further includes a coolant loop circulating a coolant stream in fluid communication with said cell stack assembly, said method comprising the steps of:

supplying said cell stack assembly with said oxidant stream at approximately ambient pressure; and utilizing a coolant regulator oriented along said coolant loop to lower said coolant stream to a subambient pressure prior to said coolant stream coming into fluid communication with said cell stack assembly.

20. The method of operating a fuel cell power plant according to claim 19, said method further comprising the steps of:

forming said coolant regulator from an accumulator and pressure valve acting in combination, said accumulator storing a amount of said coolant stream and being open to approximately ambient pressure;

orienting said pressure valve downstream of said accumulator so as to accept said coolant stream; and operating said pressure valve to lower said coolant stream exiting said pressure valve to a subambient pressure.

* * * * *